(12) United States Patent
Beezer et al.

(10) Patent No.: US 7,437,683 B1
(45) Date of Patent: Oct. 14, 2008

(54) METHOD AND APPARATUS FOR FOSTERING IMMERSIVE READING OF ELECTRONIC DOCUMENTS

(75) Inventors: John L. Beezer, Redmond, WA (US); William Hill, Carnation, WA (US); Leroy B. Keely, Portola Valley, CA (US); Darryl E. Rubin, Redmond, WA (US); David M. Silver, Redmond, WA (US); Susan D. Woolf, Seattle, WA (US); Jean Pierre De Vries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/465,879

(22) Filed: Dec. 16, 1999

(51) Int. Cl.
G06F 3/00 (2006.01)

(52) U.S. Cl. ............... 715/851; 715/764; 715/761; 715/781; 715/835; 715/839; 707/515; 707/530

(58) Field of Classification Search ............ 707/515, 707/530, 500, 526, 501, 100; 345/340, 348, 345/349, 781, 835, 839; 715/501.1, 764, 715/761, 851, 781, 835, 839
See application file for complete search history.

(56) References Cited

U.S. PATENT DOCUMENTS

| | | | | |
|---|---|---|---|---|
| 5,463,725 A | * | 10/1995 | Henckel et al. | ............ 345/776 |
| 5,761,485 A | * | 6/1998 | Munyan | .................. 715/839 |
| 5,790,122 A | | 8/1998 | Cecchini et al. | |
| 5,835,919 A | * | 11/1998 | Stern et al. | .................. 345/340 |
| 5,870,092 A | * | 2/1999 | Bedford-Roberts | ......... 715/776 |
| 5,909,690 A | * | 6/1999 | Tanigawa et al. | ............ 715/526 |
| 5,956,034 A | | 9/1999 | Sachs et al. | |
| 6,081,814 A | * | 6/2000 | Mangat et al. | .............. 707/501 |
| 6,237,011 B1 | * | 5/2001 | Ferguson et al. | ............ 707/515 |
| 6,407,757 B1 | * | 6/2002 | Ho | ............................. 345/776 |

(Continued)

FOREIGN PATENT DOCUMENTS

WO WO 9722107 6/1997

OTHER PUBLICATIONS

Mark R.Brown, "Using Netscape 2", 1995, QUE.*

(Continued)

*Primary Examiner*—Weilun Lo
*Assistant Examiner*—Mylinh Tran
(74) *Attorney, Agent, or Firm*—Birch, Stewart, Kolasch & Birch, LLP (57) ABSTRACT

An apparatus and method for presenting electronic documents to users in the form of immersive reading pages. Immersive reading pages mimic the presentation that is provided by printed paper documents. There are no traditional user interface features displayed to the user, yet the user has access to the enhanced functionality that can be provided by computer-implemented documents. In an illustrative embodiment, the user has access to intrabook (or inside-the-book), interbook (or outside-the-book) navigational features, and content interactive features, such as highlighting, annotating, drawing or looking up definitions or synonyms of words in the document. Enhanced functionality is transparently associated with elements on the immersive reading page such that the immersive reading page is without visible indicators of the association. A training mode for permitting the user to learn the transparent association behind the immersive reading pages provides visual guides to the user. The guides may be turned off after the user learns the association.

20 Claims, 6 Drawing Sheets

U.S. PATENT DOCUMENTS

| | | | | |
|---|---|---|---|---|
| 6,493,734 B1* | 12/2002 | Sachs et al. | ............... | 345/701 |
| 6,611,291 B1* | 8/2003 | Dow et al. | ............ | 348/333.01 |
| 2003/0079179 A1* | 4/2003 | Brown et al. | ............ | 715/501.1 |
| 2006/0288842 A1* | 12/2006 | Strick et al. | ............... | 84/477 R |
| 2007/0064943 A1* | 3/2007 | Ginter et al. | ............... | 380/233 |

OTHER PUBLICATIONS

Microsoft PowerPoint, 1987-1999.*
Sarah E. Hutchinson, Microsoft Power Point, Microsoft Office 97 Professional, the McGraw-Hill Company.*
Sarah E. Hutchinson, Microsoft PowerPoint 97 for Windows.*

* cited by examiner

METHOD AND APPARATUS FOR FOSTERING IMMERSIVE READING OF ELECTRONIC DOCUMENTS

TECHNICAL FIELD

The invention relates generally to methods and apparatus for displaying electronic documents. More particularly, the invention relates to methods and apparatus for presenting electronic documents in a manner that fosters an immersive reading experience like that provided by a printed paper document, while providing enhanced functionality beyond the functionality provided by a printed paper document.

BACKGROUND OF THE INVENTION

As computers have become smaller and more powerful, there have been recent efforts to provide portable, hand-held computers for rendering electronic content in a manner that is similar or identical to the way content is presented in a printed paper book or other document. Thus, much effort has focused on providing a user interface for computers that fosters an immersive reading experience, or the sensation of being "lost" in the electronic document.

One primary advantage that computers offer over printed paper documents as a means for presenting documents to users is that computers can make added functionality available to the user. Such functionality may include navigational functions that permit the user to navigate to and thus view other pages of the document, or view other documents, instantly and without considerable interruption in the user's reading experience. Such functionality may also include interaction with content, such as highlighting, annotating or looking up word definitions or synonyms in dictionaries or thesauruses.

Yet providing a user access to the enhanced functionality available in computer-implemented books without detriment to the immersive reading experience presents a challenge. For example, the prior art provides traditional user interface features, such as pull-down or pop-up menus or help balloons through which users may access additional functionality while viewing an electronic document. However, such traditional user interface features clutter the viewing area and detract from the user's immersive reading experience. Accordingly, it would be advantageous to provide a user interface which offers a user access to the enhanced functionality that can be provided by a computer-implemented book or document, yet which maximizes the potential for the user to have an immersive reading experience.

SUMMARY OF THE INVENTION

The present invention addresses the aforementioned problems by providing an apparatus and method for presenting electronic documents to users in the form of immersive reading pages. Immersive reading pages mimic the presentation that is provided by printed paper documents. There are no traditional user interface features displayed to the user, yet the user has access to the enhanced functionality that can be provided by computer-implemented documents. For example, the user has access to intrabook (or inside-the-book) navigational features, such as paging forward and paging backward. The user also has access to interbook (or outside-the-book) navigational features, such as links to other documents, including help documents and library documents, which are listings of other documents. The user also has access to content interactive features, such as highlighting, annotating, drawing or looking up definitions or synonyms of words in the document. According to the invention, this enhanced functionality—functionality that is beyond what is found in a printed paper document—is accessible to the user without detracting from the immersive reading experience.

To accomplish this, the invention provides a method and apparatus for displaying electronic documents in which enhanced functionality is transparently associated with elements displayed on the immersive reading page. For example, an immersive reading page of a book displayed on the computer display will have elements, such as a page number, title line and content—the actual text of the story read by the user as he or she reads the book. These are elements that would appear in a traditional paper book page. The enhanced functionality provided by the computer is associated with these elements in a transparent fashion, such that a user may access the functionality by tapping on interaction zones associated with particular elements but no visual indicators or controls are displayed on the immersive reading page. Since the enhanced functionality is transparently associated with immersive reading page elements, the enhanced functionality is made available to the user without the addition of traditional user interface features and the book is presented in a manner that encourages an immersive reading experience. Thus, the enhanced functionality may be accessed by the user using a selection device, for example, tapping on a touch sensitive screen in an interaction zone corresponding to an element of the immersive reading page.

According to yet another aspect of the invention, the association between immersive reading page elements and enhanced functionality is provided according to coherent user models, in which a particular type of functionality is associated with a particular type of element on the immersive reading page. For example, intrabook navigational features are transparently associated with the page number displayed on the book page, interbook navigational features are transparently associated with the title line displayed on the book page and content interaction features are transparently associated with the words in the content of the book. Association according to coherent user models makes the transparent association intuitive and easier to learn.

Another aspect of the invention provides a training mode for permitting the user to learn the transparent association behind the immersive reading pages. In an exemplary reading application embodying the invention, a visual guides mode is provided in which a user may view the immersive reading pages with visual guides as to the interaction zones for which enhanced functionality is associated. The visual guides aid the user in intuitively recognizing the association between the elements displayed on the immersive reading page and the enhanced functionality associated with particular elements. After the user has learned the associations, visual guides mode may be toggled off and the immersive reading pages are displayed without any visual guides.

BRIEF DESCRIPTION OF THE DRAWINGS

The present invention is illustrated by way of example in the accompanying Figures, which should not be construed as limiting, in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
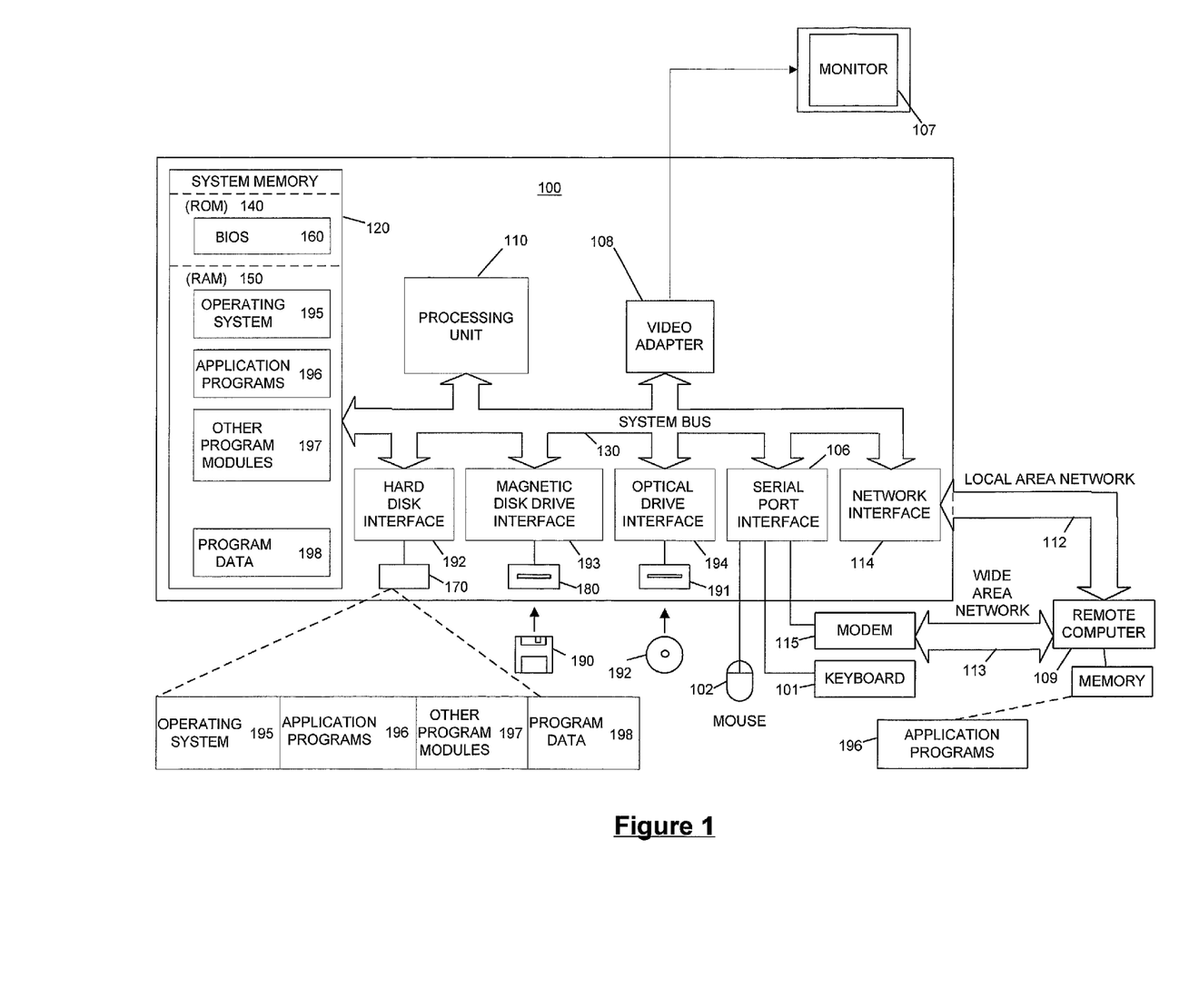
FIG. 1 is a schematic block diagram of a general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general purpose computing device in the form of a conventional personal computer 100, having a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150. A basic input/output system 160 (BIOS), containing the basic routines that helps to transfer information between elements within the personal computer 100, such as during start-up, is stored in ROM 140.

The personal computer 100 further includes a hard disk drive 170 for reading from and writing to a hard disk (not shown). Also included are a magnetic disk drive 180 for reading from or writing to a removable magnetic disk 180, and an optical disk drive 191 for reading from or writing to a removable optical disk 192 such as a CD-ROM or other optical media. The hard disk drive 170, magnetic disk drive 180, and optical disk drive 191 are connected to the system bus 130 by a hard disk drive interface 192, a magnetic disk drive interface 193, and an optical drive interface 194, respectively. The drives and their associated computer-readable media provide nonvolatile storage of computer readable instructions, data structures, program modules and other data for the personal computer 100. Although the exemplary environment described herein employs a hard disk 170, a removable magnetic disk 190 and a removable optical disk 192, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor and speakers, personal computers typically include other peripheral output devices (not shown), such as printers.

The personal computer 100 may operate in a networked environment using logical connections to one or more remote computers, such as remote computer 109. Each remote computer 109 may be another personal computer, a server, a router, a network PC, a peer device or other common network node, and typically includes many or all of the elements described above relative to the personal computer 100, although only a memory storage device 150 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local area network 112 through a network interface or adapter 114. When used in a WAN networking environment, the personal computer 100 typically includes a modem 115 or other means for establishing communications over WAN 113. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
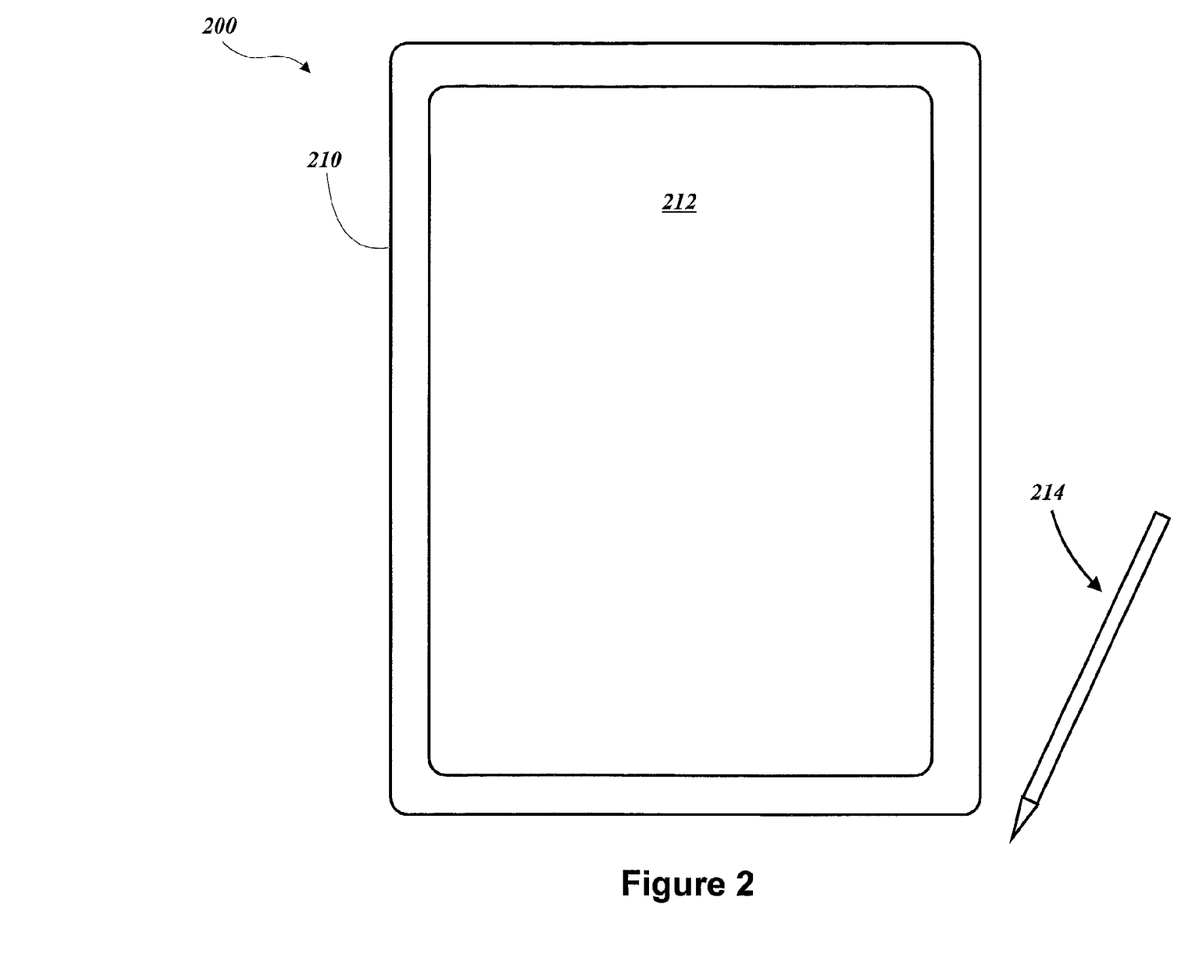
FIG. 2 illustrates an exemplary hand-held computer system that can be used in accordance with various aspects of the invention.

FIG. 2 illustrates a hand-held computer that can be used in accordance with various aspects of the invention. Any or all of the features, subsystems and functions of the system described with respect to FIG. 1 can be included in the hand-held computer of FIG. 2. Computer 200 includes a computer housing 210 and a display 212, for example a touch-sensitive flat panel Liquid Crystal Display (LCD). Using a selection device 214, such as a stylus, a user can select various areas of the display 212 in order to access to various electronic documents and enhanced functionality according to the invention as will be explained below.

Those of ordinary skill will understand that selection device 214 may include hard or soft buttons built into the hand-held computer 200 for selecting particular associated functionality. Moreover, the selection device 214 may include a user's own finger used to select appropriate areas on the touch-sensitive display 212. Thus, the term "selection device" is intended to have a broad definition and encompasses many variations on well-known input devices.

Figure 3:
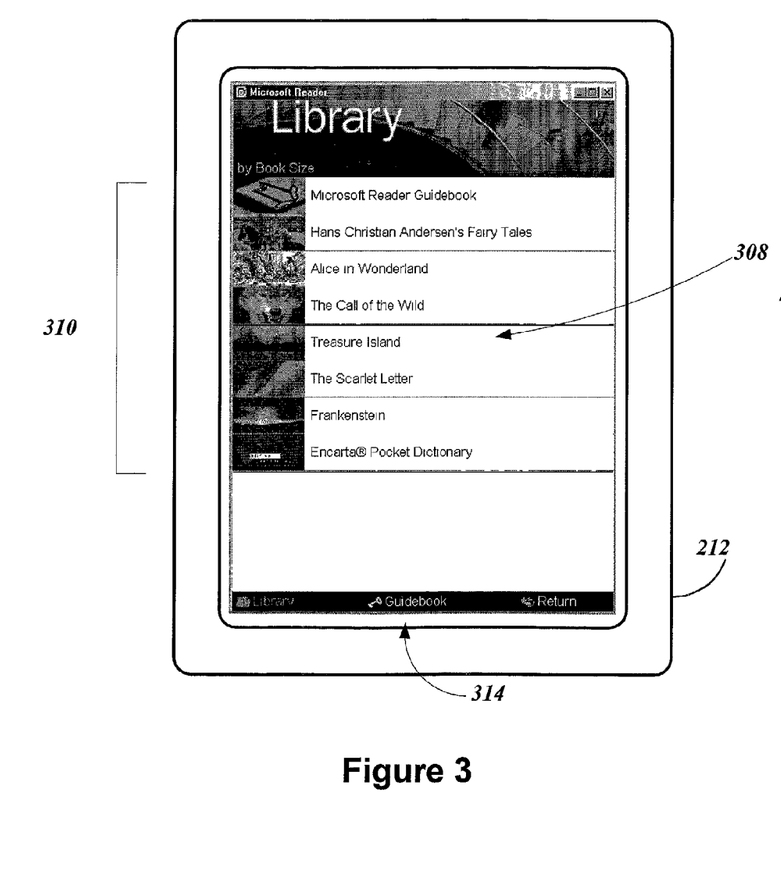
FIG. 3 illustrates an exemplary user interface for providing user access to a library of books or electronic documents.

FIG. 3 illustrates an exemplary user interface for providing user access to a library of books or other electronic documents. A library page 308 is displayed on display 212. A series of titles 310 is presented to the user and includes titles of classic novels, for example, as well as titles of other useful documents such as a dictionary. When a user taps on a particular one of the titles 310, the title page of the selected title is displayed to the user, as shown for example in FIG. 4.

Figure 4:
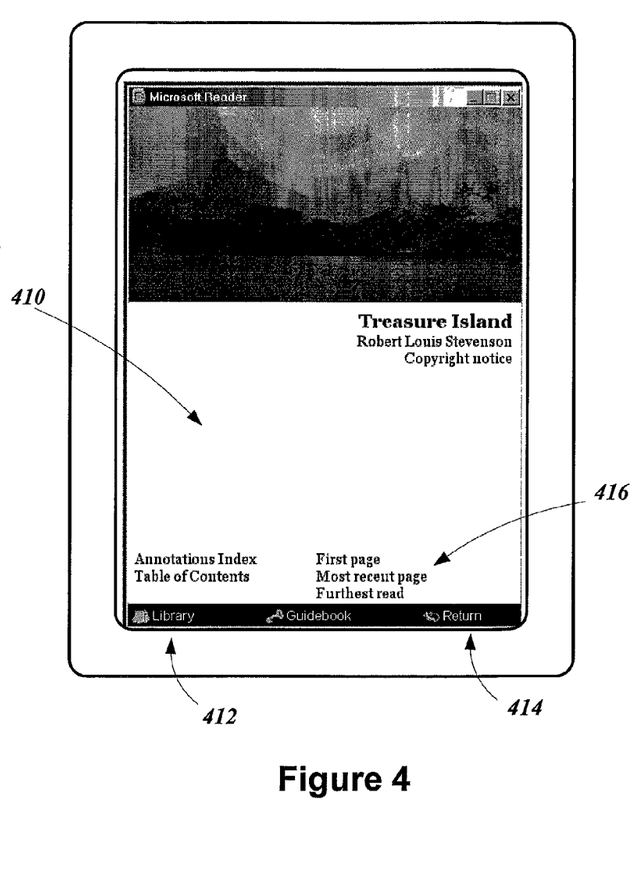
FIG. 4 illustrates an exemplary immersive reading page in the form of a book title page according to the invention.

FIG. 4 illustrates an exemplary the title page 410 for one of the book titles listed on library page 308. A LIBRARY button 412 enables a user to navigate back to the library page 308 and a RETURN button 414 enables a user to navigate to a previously displayed page. Also displayed on the title page 410 are a number of controls or links 416 for navigating within the selected book or to an annotations index. For example, the FIRST PAGE link allows a user to navigate to a first page of the book and the MOST RECENT PAGE link allows the user to navigate to the most recently displayed page of the book from a previous reading session.

It will be recognized that navigation of the electronic documents preferably occurs in a single-window or single page viewing environment that provides a single navigational focus. That is, only one page of a document can be displayed on display 212 at one time. This is consistent with the immersive reading environment that is an aspect of the invention. As will become apparent from further reading of this disclosure, the present invention is applicable to hand-held devices which permit only a single document context to be viewed at any one time, and desktop or other computers having multiple-window operating systems which permit multiple windows to be viewed wherein a reading application—the application that provides for the immersive reading of electronic document—is associated with one of the windows.

Figure 5:
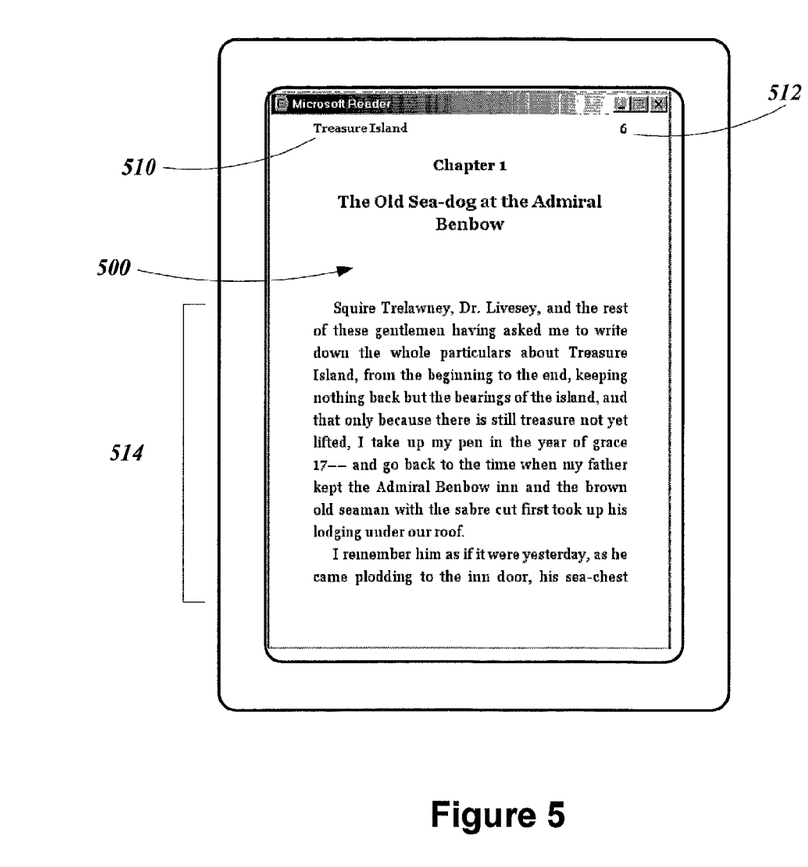
FIG. 5 illustrates an exemplary immersive reading page in the form of a book page according to the invention.

FIG. 5 illustrates an exemplary immersive reading page 500 in the form of a book page according to the invention. A title line 510, page number 512 and content 514 are displayed on the book page. Significantly, the immersive reading page 500 mimics a printed book page in that the immersive reading page appears without traditional user interface features on the page, as it would appear if the elements—title line 510, page number 512 and content—were printed in a paper book.

According to one aspect of the invention, the page number 512 is transparently associated with enhanced functionality providing page turning capabilities, which may be accessed by a user tapping on a page number element on the immersive reading page. As used in this specification, the term "element" refers to a word, symbol or picture on the display and may also refer to areas associated with or in the immediate vicinity of a word, symbol or picture. For example, when a user taps an area immediately to the left of the page number 512, a previous page is displayed and when a user taps an area immediately to the right of the page number 512, a subsequent page is displayed. Thus, the functionality providing page turning capabilities may be accessed by simply tapping on or near the page number 512 displayed on the immersive reading page. This functionality is transparently associated with the immersive reading page number element and traditional user interface features, such as a "go to" button for example, are not present to interfere with the user's immersive reading experience.

Figure 6:
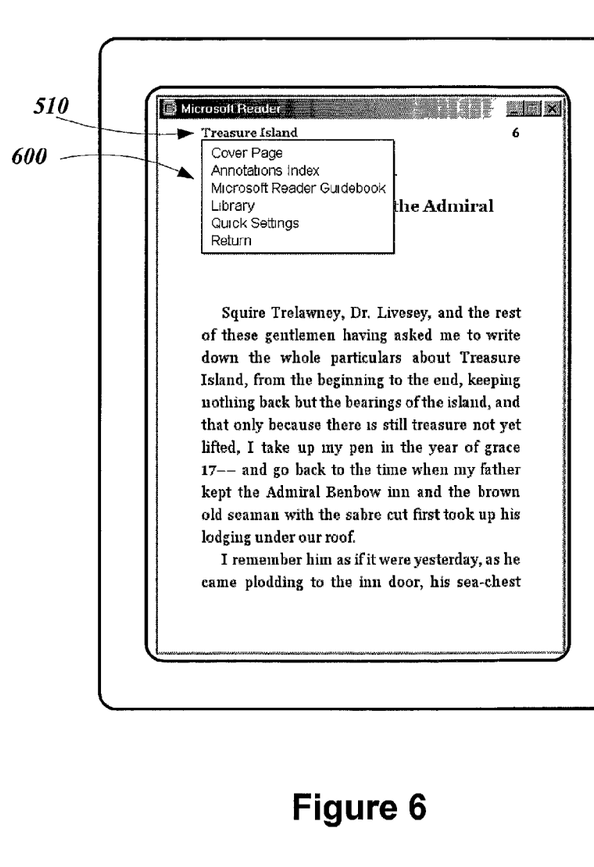
FIG. 6 illustrates an exemplary immersive reading page showing interbook navigation functionality that is associated with a title line displayed on the immersive reading page.

FIG. 6 illustrates an exemplary immersive reading page showing interbook navigation functionality that is associated with the title line 510 displayed on the immersive reading page. When a user taps on the title line 510, an on-object user interface 600 is displayed and presents the user with a list of descriptive links which may be tapped to access interbook navigational functions. The MICROSOFT READER GUIDEBOOK link permits a user to access another document which may provide help and settings control to the user. The LIBRARY link permits a user to access the library page 308 (FIG. 3). The RETURN link permits a user to navigate to a document previously displayed. The QUICK SETTINGS link permits a user to navigate directly to the settings control page of a help and settings control document. In addition to the interbook navigational links just described, the on-object user interface 600 may include intrabook navigational functionality as well. For example, the COVER PAGE link permits navigation to the book title page 410 and the ANNOTATIONS INDEX link permits navigation to an annotations index associated with the book being displayed.

Figure 7:
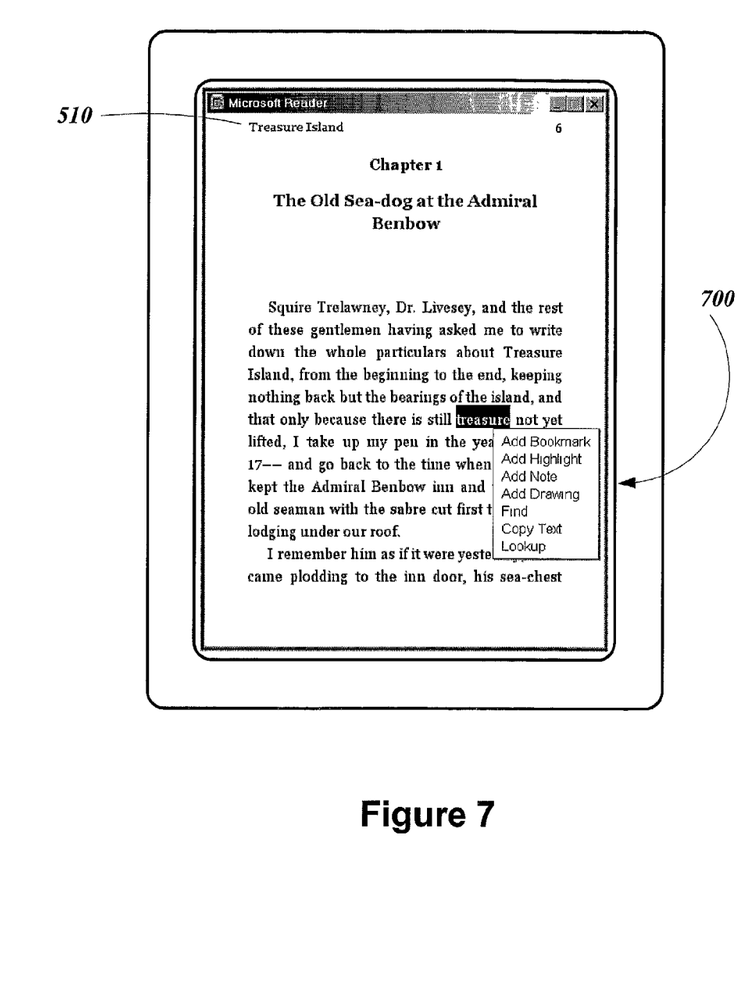
FIG. 7 illustrates an exemplary immersive reading page showing content interaction functionality that is associated with content displayed on the immersive reading page.

FIG. 7 illustrates an exemplary immersive reading page 500 showing content interaction functionality that is associated with content 514 displayed on the immersive reading page. According to another aspect of the invention, an on-object user interface 700 is displayed when a user taps on a word or element of the immersive reading page content 514. The on-object user interface 700 provides access to content interaction functionality by presenting to the user a list of commands that may be performed on or in relation to the selected element of the content 514, in this case the word "treasure." This enhanced functionality is transparently associated with the content elements since no visual indication of the association is evident on the immersive reading page 500. The on object user interface 700 permits a user to access a ADD BOOKMARK command, which will provide a bookmark indicator in relation to the immersive reading page. Similarly, the ADD HIGHLIGHT command will highlight the selected element, the ADD NOTE command will permit a user to enter a note associated with the selected element and the ADD DRAWING command will permit a user to provide a drawing associated with the selected element using a drawing feature of the reading application. As will be explained, the bookmarks, highlights, notes and drawings may be shown or hidden, depending on user configuration of the reading application used to view the book. Configuration occurs through a QUICK SETTINGS page of a help and settings control document that will be explained relative to FIG. 8. Thus, the user has control over the extent to which the immersive reading page is provided with visual indications of bookmarks, highlights, notes and drawings.

As will be apparent to those of ordinary skill from the foregoing description of the enhanced functionality provided by the invention, the immersive reading page is without traditional user interface features, yet a user is provided with access to enhanced functionality—functionality beyond what is provided by a paper book or document. Access to this enhanced functionality is provided by transparent association of the functionality with existing elements of the immersive reading page. The user recognizes this association intuitively or through the use of visual guides, as will be explained below.

As will also be apparent to ordinarily skilled artisans by the foregoing description, the association between immersive reading page elements and enhanced functionality is provided according to coherent user models. That is, a particular type or category of functionality is associated with a particular type or category of element on the immersive reading page. For example, the intrabook navigational feature of page turning is transparently associated with the page number displayed on the immersive reading page. Similarly, the interbook navigational features are transparently associated with the title line displayed on the book page. Likewise, content interaction functionality is transparently associated with respective content elements.

Figure 8:
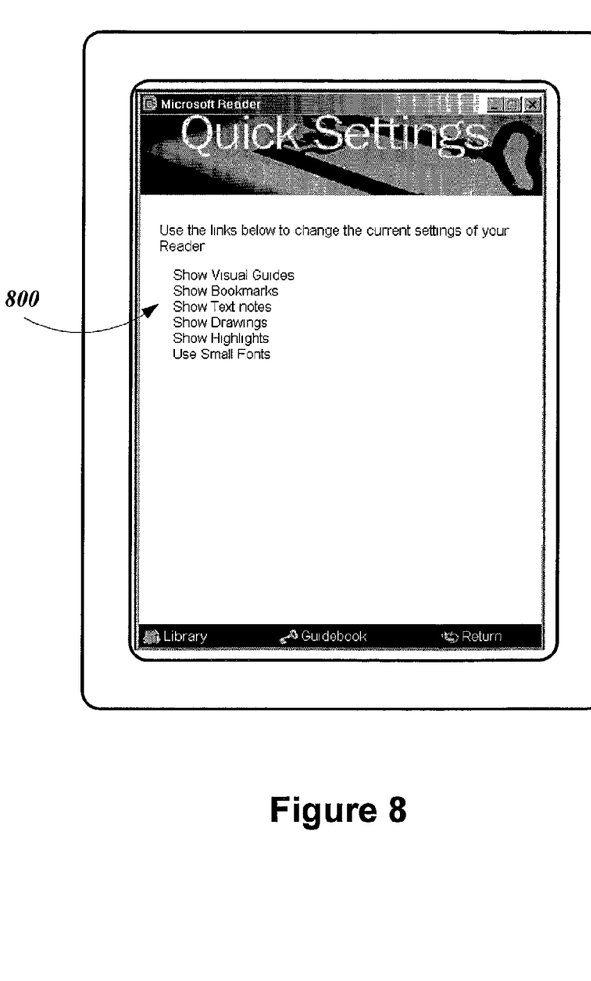
FIG. 8 illustrates an exemplary control document for toggling visual guides mode according to the invention.
Figure 9:
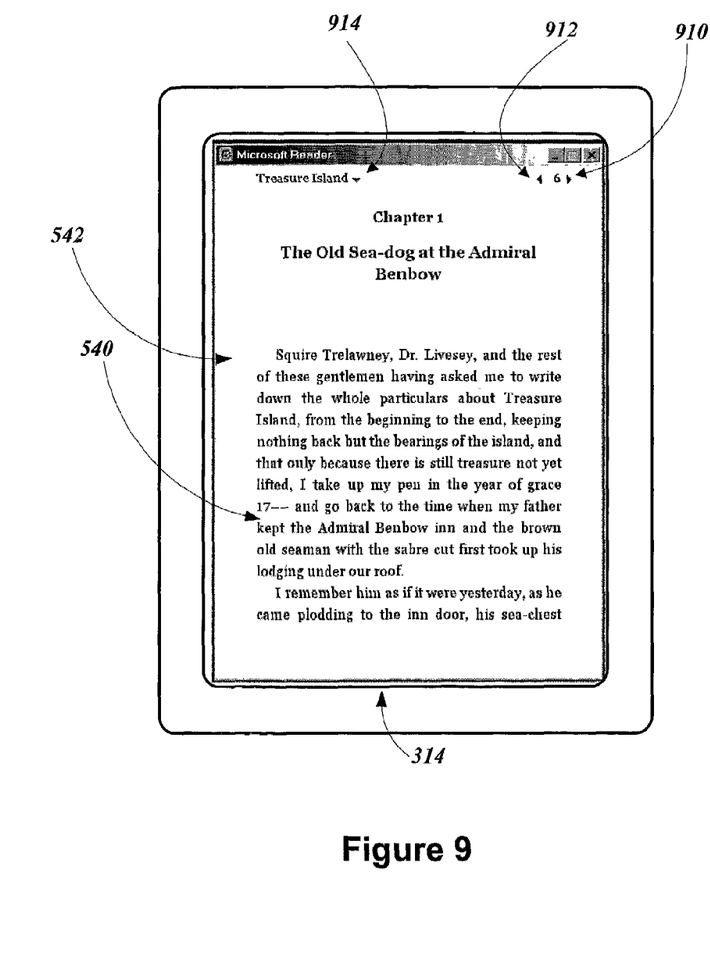
FIG. 9 illustrates an exemplary immersive reading page having visual guides displayed.

According to another feature of the invention, an enabling technology is provided in the form of a training mode for permitting the user to learn the transparent association reflected in the immersive reading pages of a document. Referring to FIG. 8, from within a help and settings control document, a user may access a settings control page 800 which contains links configured to alter settings of the reading application. Here, a number of links, such as SHOW BOOKMARKS, SHOW TEXT NOTES, SHOW DRAWINGS and SHOW HIGHLIGHTS are presented for displaying on the immersive reading pages, a number of indicators corresponding to content interaction functions. In addition, a link entitled SHOW VISUAL GUIDES may be selected to invoke the training mode according to the invention. When the SHOW VISUAL GUIDES link is selected by a user, the immersive reading pages are displayed as shown in FIG. 9 with visual indicators 910, 912 and 914 to indicate, usually to a new user, that enhanced functionality is associated with the immersive reading page element. Relative to the page number element 512, a visual indicator 912 is provided to the left of the page number 512 to indicate to the user that intrabook navigational functionality of paging back is associated with the area to the left of the page number 512. Similarly, a visual indicator 910 is provided to the right of the page number 512 to indicate that intrabook navigational functionality of paging forward is associated with the area to the right of the page number 512. Title line 510 is provided with a visual indicator 914 to indicate to the user that interbook navigational functionality is associated with the title line elements.

It will be recognized by those of ordinary skill that, although exemplary indicators in the form of visual indicators are described with reference to the training mode of the invention, other indicators are contemplated by the invention and intended to be encompassed by the appended claims. For example, audio indicators may be provide in which recorded sounds are played to a user through a sound system associated with the computer to teach the associations between immersive reading page elements and the enhanced functionality provided in accordance with the invention.

Although exemplary systems according to the invention have been described above, it should be appreciated that a variety of modifications will be readily available to persons utilizing the invention. The foregoing description is not intended to be limiting, but is merely illustrative of exemplary adaptations of the invention. Other products, apparatus and methods which incorporate modifications or changes to that which has been described herein are equally included within this application.

What is claimed is:

1. In a computer system having a user interface, including a touch-sensitive display, a method of displaying an electronic document including a plurality of pages, the method comprising the steps of:

displaying a page of the electronic document to a user as an immersive reading page, the immersive reading page having the visual characteristics of a printed paper page;

associating navigational functionality with an interactive region of the immersive reading page, wherein a page number of the immersive reading page is displayed, the interactive region spans only a portion of the immersive reading page, and the navigational functionality comprises displaying another immersive reading page of the electronic document; and carrying out the navigational functionality in order to display another immersive reading page of the electronic document, the navigational functionality being carried out in response to the user tapping the touch-sensitive display at the interactive region corresponding to the page number of the immersive reading page, wherein the navigational functionality is transparent to the user prior to the user tapping the touch-sensitive display at the interactive region of the immersive reading page, the interactive region is in proximity of the displayed page number, the interactive region including an area to the right of the page number and an area to the left of the page number on the display, and in response to the user tapping the area to the right of the page number, the navigational functionality is carried out by replacing the displayed page of the document with a subsequent page of the document, and in response to the user tapping the area to the left of the page number, the navigational functionality is carried out by replacing the displayed page of the document with a previous page of the document.

2. The method of claim 1, further comprising the step of invoking a training mode for teaching the association to a user.

3. The method of claim 1, wherein the electronic document is a book in electronic form and the immersive reading page has the visual characteristics of a printed paper page of a book.

4. The method of claim 1, wherein the displaying includes displaying only one immersive reading page at a time.

5. The method of claim 1, further including teaching the association to the user by providing audio indicators.

6. The method of claim 1, further including associating additional functionality with a second interactive region of the immersive reading page, wherein an element different than the page number is displayed in the second interactive region, and the additional functionality is different from the navigation functionality associated with the interactive region in which the page number is displayed.

7. The method of claim 6, wherein the element is a title.

8. A computer-readable medium having stored thereon computer-executable instructions for performing a method of displaying an electronic document including a plurality of pages on a touch-sensitive display of a computer system, the method comprising the steps of:

displaying a page of the electronic document to a user as an immersive reading page, the immersive reading page having the visual characteristics of a printed paper page;

associating navigational functionality with an interactive region of the immersive reading page, wherein a page number of immersive reading page is displayed, the interactive region spans only a portion of the immersive reading page, and the navigational functionality comprises displaying another immersive reading page of the electronic document;

sensing the user tapping the touch-sensitive display at the interactive region corresponding to the page number of the immersive reading page; and carrying out the navigational functionality in order to display another immersive reading page of the electronic document, the navigational functionality being carried out in response to the user tapping the interactive region corresponding to the page number of the immersive reading page, wherein the navigational functionality associated with the page number is transparent to the user prior to the user tapping the touch-sensitive display at the interactive region of the immersive reading page, the interactive region is in proximity of the displayed page number, the interactive region including an area to the right of the page number and an area to the left of the page number on the display, and in response to the user tapping the area to the right of the page number, the navigational functionality is carried out by replacing the displayed page of the document with a subsequent page of the document, and in response to the user tapping the area to the left of the page number, the navigational functionality is carried out by replacing the displayed page of the document with a previous page of the document.

9. The computer-readable medium of claim 8 having stored thereon computer-executable instructions, for performing the step of invoking a training mode for teaching the association to a user.

10. The computer-readable medium of claim 8, wherein the electronic document is a book in electronic form and the immersive reading page has the visual characteristics of a printed paper page of a book.

11. The computer-readable medium of claim 8 having stored thereon computer-executable instructions, wherein the step of displaying includes displaying only one immersive reading page at a time.

12. The computer-readable medium of claim 8 having stored thereon computer-executable instructions, for performing the step of teaching the association to the user by providing audio indicators.

13. The computer-readable medium of claim 8 having stored thereon computer-executable instructions, for performing the step of associating additional functionality with a second interactive region of the immersive reading page, wherein an element different than the page number is displayed in the second interactive region, and the additional functionality is different from the navigation functionality associated with the interactive region in which the page number is displayed.

14. The computer-readable medium of claim 13, wherein the element is a title.

15. The computer-readable medium of claim 8, wherein the interactive region constitutes areas in an immediate vicinity of the page number.

16. In a computer system having a user interface, including a touch-sensitive display, a method of displaying an electronic document including a plurality of pages, the method comprising the steps of:

displaying a page of the electronic document to a user as an immersive reading page, the immersive reading page having the visual characteristics of a printed paper page;

associating navigational functionality with an interactive region of the immersive reading page, wherein an element of the immersive reading page is displayed, the interactive region spans only a portion of the immersive reading page, and the navigational functionality comprises displaying another immersive reading page of the electronic document; and carrying out the navigational functionality in order to display another immersive reading page of the electronic document, the navigational functionality being carried out in response to the user tapping the touch-sensitive display at the interactive region corresponding to the element of the immersive reading page, wherein the navigational functionality is transparent to the user prior to the user tapping the touch-sensitive display at the interactive region of the immersive reading page, the interactive region is in proximity of the displayed element, the interactive region including an area to the right of the element and an area to the left of the element on the display, and in response to the user tapping the area to the right of the element, the navigational functionality is carried out by replacing the displayed page of the document with a subsequent page of the document, and in response to the user tapping the area to the left of the element, the navigational functionality is carried out by replacing the displayed page of the document with a previous page of the document.

17. A computer readable medium having computer-executable instructions stored thereon for performing the method of claim 16.

18. The method of claim 16, further including associating additional functionality with a second interactive region of the immersive reading page, wherein a second element of the immersive reading page is displayed in the second interactive region, and the additional functionality is different from the navigation functionality associated with the interactive region in which the second element is displayed.

19. The method of claim 18, wherein the second element is a title.

20. The method of claim 16, wherein the interactive region constitutes areas in an immediate vicinity of the element.

* * * * *